Patented Feb. 11, 1941

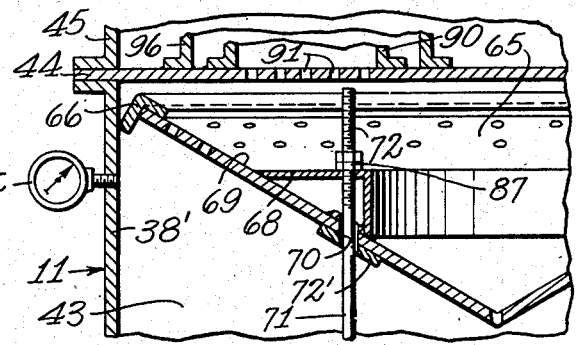
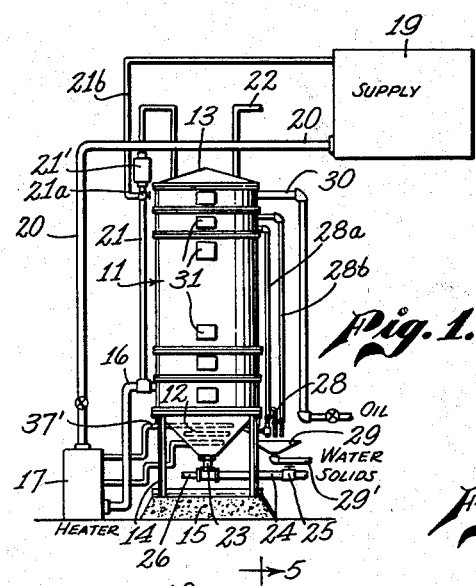
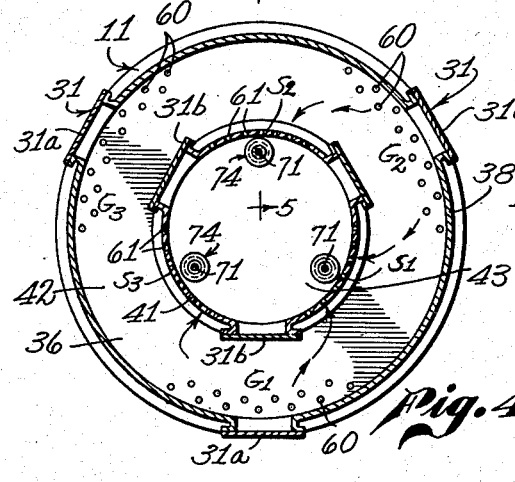
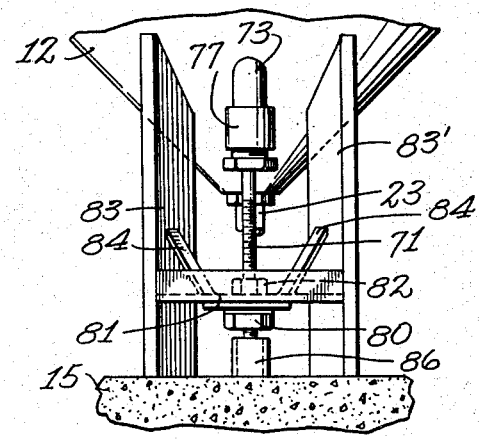

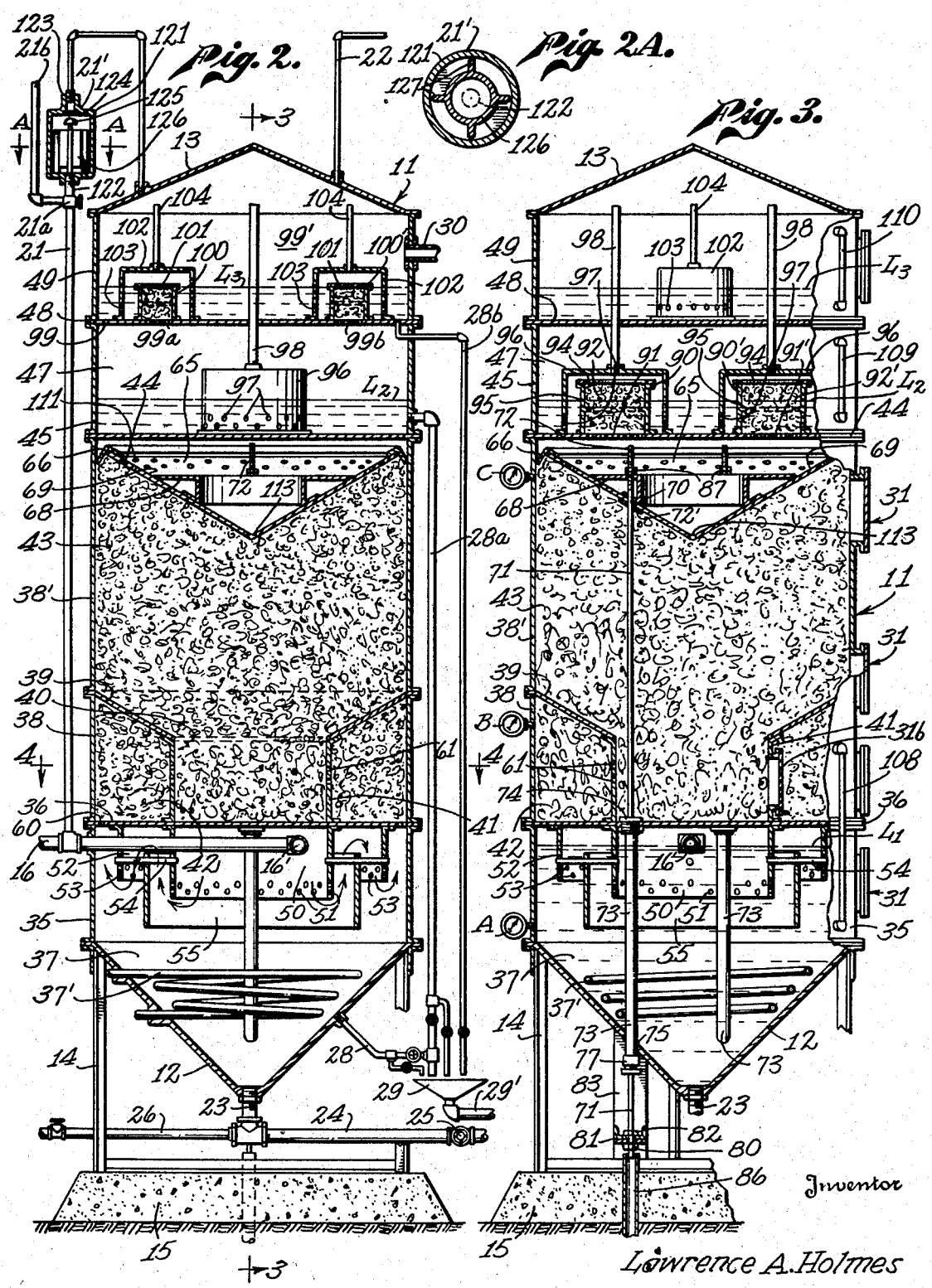

2,231,269

UNITED STATES PATENT OFFICE 2,231,269

APPARATUS FOR SEPARATING CONTAMINATED FLUID MIXTURES

Lawrence A. Holmes, Whittier, Calif.

Application June 29, 1936, Serial No. 87,827

4 Claims. (Cl. 210—47)

This invention has to do in a general way with the production of petroleum oil and is more particularly related to a process and apparatus for separating water, solids and entrained gas from oil as it is produced at the well, to produce a clean petroleum suitable for refinery operations.

The process contemplated by this invention includes first passing the contaminated fluid mixture through a body of washing liquid, such as water or other suitable liquid. A solution of an emulsion breaking reagent may, if desired, be employed in this step of the process to assist in the preliminary disruption of the emulsion film. This first step, therefore, is effective to precipitate solids and release and precipitate some of the water from the mixture.

After the mixture has passed through this initial washing step it is then passed through a body of compressible porous material where it is subjected to what I have termed a scrubbing operation in which the emulsion films are further disrupted and broken down to separate the oil and water and in which solids carried beyond the washing step are filtered from the liquid, the free water, except for the finally disbursed particles thereof, separating from the oil by gravitation.

Following the scrubbing step the oil with such water as is still carried therein in minute particles is subjected to what I have termed a rinsing step in which it is passed through a body of water, such water being effective to coalesce the minute particles of water from the oil thereby effecting their final separation.

It is a primary object of this invention to provide a novel form of apparatus for practicing the process outlined above, such apparatus incorporating adjustable means for varying the compression in the porous body whereby the porosity of such body may be changed to suit the particular pressure and flow conditions under which the apparatus is operating and also to suit the character of the particular mixture that is being treated. In this latter connection I have discovered that the disruption of the emulsion films in different types of emulsions, by passing such emulsions through a porous body, is governed to a large degree by the porosity of the body. My invention, therefore, contemplates means whereby the porosity of the body can be readily adjusted by the operator to suit the particular mixture or emulsion that is being treated.

Although various materials may be used in making up the porous body contemplated by this invention, I have discovered that shredded wood or wood wool comprised of very fine fibers of soft wood lends itself particularly to this use since it may be easily compressed to vary the porosity of a body composed thereof and further in view of the fact that it can be economically obtained and easily handled.

In this latter connection it is a further object of this invention to produce an apparatus of the class described in which the filter body or body of porous material is readily accessible for inspection and replacement.

My invention also contemplates a novel system of baffles so arranged within the treating apparatus as to control the path of flow of the fluid mixture passing therethrough so that the fluid is uniformly distributed over a maximum area in traversing each of the successive treating bodies.

It is a further object of this invention to provide an apparatus of the class described which can be economically constructed and operated with a minimum amount of attention.

The details in the process contemplated by this invention, together with the details in the construction of one preferred form of apparatus for practicing the process will be best understood from the following description of the accompanying drawings which are chosen for illustrative purposes only and in which Fig. 1 is an elevational view more or less diagrammatically illustrating one preferred form of apparatus contemplated by this invention;

Fig. 2 is a sectional elevation illustrating further details in the construction of the treating chamber shown in Fig. 1;

Fig. 2A is a plan section on the line A—A of Fig. 2;

Fig. 3 is a sectional elevation in a plane represented by the line 3—3 of Fig. 2;

Fig. 4 is a plan section taken in a plane represented by the line 4—4 of Fig. 3;

Fig. 5 is an enlarged fragmentary sectional elevation taken in a plane represented by the line 5—5 of Fig. 4; and Fig. 6 is a fragmentary elevation taken in a plane represented by the line 6—6 of Fig. 5.

Referring now to the drawings with particular reference to Fig. 1, numeral 11 indicates a vertical shell or tank which is shown as being provided with a conical bottom 12 and a cover 13. The shell 11 is shown as being supported by a frame structure comprised of legs 14 which in turn is carried by a suitable foundation indicated generally by reference numeral 15.

Reference numeral 16 indicates a fluid inlet which extends into the shell in the bottom thereof, such inlet being shown as leading from a heater 17, the use of which is optional depending upon the character of the fluid mixture to be treated. The fluid mixture is delivered to the shell (through the heater in this embodiment of my invention) from a supply tank 19 or other suitable source such as a pump, which has an outlet pipe 20. The inlet connection 16 is shown as being provided with a gas vent 21 which extends into the top portion of the shell 11 and the shell 11 is provided with a gas vent 22 through which gases and vapors are conducted to a vapor recovery system (not shown). The vent pipe 21 is shown as being provided with a float controlled valve 21' designed to prevent the flow of liquid through the pipe 21 into the top of the treating shell. A safety blow-off valve 21a is also provided in the pipe 21 below the float valve 21' to prevent pressure in the shell rising above a predetermined maximum value in the event the system is being operated under pressure. This blow-off valve 21a may be connected through a line 21b to any suitable storage such as the supply reservoir.

For the purpose of discharging solids such as mud and sand which are released in the shell, I show the conical bottom 12 as being provided with an outlet connection 23 which has a discharge pipe 24 equipped with a valve 25. At a point in the discharge pipe 24 beneath the outlet connection 23 I provide a high pressure steam, water or air inlet connection 26 which acts as an ejector for withdrawing sediment from the conical bottom and forcing the steam upwardly through the pipe 25.

The water released in the shell, in a manner which will be described hereinafter, is withdrawn therefrom at various points to maintain the proper water levels, and in Fig. 1 the water outlet pipes are indicated by reference numerals 28, 28a and 28b, such pipes discharging into a funnel 29 which is connected with a water discharge conduit 29'. The cleaned oil, being lighter than the water, naturally rises to the top of the shell and for the purpose of withdrawing such cleaned oil, I provide the shell with an oil outlet indicated by reference numeral 30. For the purpose of inspecting the various chambers in the shell from time to time, and to permit the removal and replacement of the porous body material, I show the shell as being equipped with a plurality of manholes or windows indicated generally by reference numeral 31.

Referring now to Figs. 2 to 6 inclusive, which illustrate the details in the construction of one preferred embodiment of my invention, it will be observed that the cylindrical portion of the shell 11 is comprised of a plurality of ring sections, also that flanged connections are employed throughout in the fabrication of this shell, but it is to be understood that other types of fabrication may be employed without departing from the scope of this invention.

The first or bottom ring section 35 which is mounted at the upper edge of the conical bottom 12 carries at its upper edge what I have termed a first partition member 36 which forms a washing chamber 37 therebelow. The washing chamber 37 is shown as being provided with heating means 37' which may be in the nature of a coil adapted to carry steam or other fluid heated in any suitable manner such as by means of the heater 17. It will be observed that the inlet connection 16 extends through the wall of this ring section 35 below the partition 36 and terminates near the midportion of this partition where it is provided with a T discharge fitting 16'.

The next element in the shell is comprised of two ring sections 38—38', the section 38 being mounted upon the periphery of the partition member 36 and carrying at its upper edge an annular conical plate 39 which has an opening 40 through its center. The annular plate 39 cooperates with an inner ring member 41 to form an angular partition immediately above the fixed horizontal partition 36, such angular partition 40—41 cooperating with the peripheral portion of the partition 36 to form an annular auxiliary wedge-like chamber 42 within a main scrubbing chamber 43, such scrubbing chamber being defined by the first or bottom fixed partition 36, the shell sections 38—38' and a second horizontal fixed partition 44 mounted on the upper edge of the section 38'.

A ring section 45 is mounted on the periphery of the partition member 44 and cooperates therewith to form what I have termed a first rinsing chamber 47, the top of which is defined by a horizontal partition member 48 and a ring section 49 is interposed between the periphery of this last mentioned partition member and the cover 13 of the shell.

For the purpose of effecting a uniform distribution of the fluid mixture in the shell as it passes therethrough, and further to insure a fluid mixture traveling through a substantial amount of washing liquid contained in the washing chamber 37, I show such chamber as being provided with a baffle system which, in this form of my invention comprises an inner baffle ring 50 mounted on the bottom of the partition member 36, enclosing the discharge fitting 16' on the inlet connection and extending a substantial distance therebelow. The lower edge of this baffle member is provided with perforations indicated at 51. In addition to the inner baffle ring 50, I provide an outer baffle ring 52 which is also secured to the bottom of the partition 36 in radially spaced relation with the ring 50 and is provided with apertures 53 in its lower end. Suspended between these baffle rings 50 and 52 on cross rods 54, is an intermediate baffle ring 55, the upper edge of which is positioned in a plane below the partition 36 and above the lower edges of partitions 50 and 52, and the lower edge of which is positioned a substantial distance below the lower edge of baffle ring 50.

The system of baffle rings just described directs the low gravity component (oil or oil emulsion, in the case of an oil and water mixture) of the fluid mixture, entering the washing chamber from the discharge connection 16', through a path indicated by the arrows in Fig. 2. From these arrows it will be seen that the low gravity liquid is first forced downwardly in the washing liquid through the perforations in the inner baffle ring where it is broken up into small streams, such streams flowing upwardly through the washing liquid and over the upper edge of the intermediate baffle ring and then downwardly beneath the lower edge of the outer ring and through the perforations therein.

This fluid then rises upwardly toward the peripheral portion of the partition 36 which is provided with perforations indicated generally by reference numeral 60. The perforations 60 are preferably arranged in sets or groups which are angularly spaced apart as indicated by the groups G1, G2 and G3 in Fig. 4, such groups of perforations delivering the fluid into angularly spaced regions within the annular distributing chamber 42.

The chamber 42 is filled with a tightly packed porous material such as the wood wool referred to above and such material acts as an initial filter to separate the suspended solids from the fluid in a region where they can be readily removed with the porous material through the manholes 31a illustrated in Fig. 4. This porous material also has a secondary tearing or disrupting effect upon the emulsion films and is consequently effective to free a portion of the water which will gravitate back down through the perforations 60 into the washing chamber 37 and the wedge-like shape of the chamber 42 causes this packing under the action of the pressure fluid to pack tightly into the region of the inner ring 41. The chief purpose of the distributing chamber 42, however, is to effect a substantially uniform distribution of the fluid throughout the midportion of the scrubbing chamber and also to deliver the fluid into such chamber in a manner such that the tendency of the fluid to migrate to the side walls and rise therealong without passing through the porous body is reduced to a minimum.

For the purpose of effecting this distribution of fluid within the scrubbing chamber, I show the inner ring partition 41 as being provided with perforations indicated at 61 (see Fig. 4). In order that the fluid may be caused to traverse a substantial length of porous material in the chamber 42 before it is admitted to the main body of scrubbing material in the chamber 43, I consider it preferable to arrange the perforations 61 in groups or sets indicated at S1, S2 and S3 in Fig. 4, such sets of perforations being positioned in angularly offset or staggered relation to the groups (G1, G2 and G3) of perforations 60 in the partition 36.

The scrubbing chamber 43 is, as has been pointed out above, filled with a compressible body of porous material such as finely shredded wood wool and as has been also pointed out above, it is a primary object of this invention to provide an apparatus of the class described with means whereby the compression on this body of porous material can be easily and quickly adjusted so as to vary its porosity depending upon operating conditions.

For the purpose of compressing this body of material, I provide what may be termed a movable partition member 65 which rests on top of the compressible body in the scrubbing chamber 43 and which is adapted for vertical movement with respect to the partition member 36 and the ring plate 39 upon which this body of material rests. Although this movable partition 65 may be flat or in other cross sectional shape, I consider it preferable to form this partition as an inverted cone. In this way the compressive force applied to the body by the downward movement of such cone is directed outwardly toward the sides of the shell so that there is a force component compressing the material toward the side walls which prevents or inhibits the migration of fluid upwardly along the side walls without traversing the filtering material. This conical compressing member is preferably formed on the same angle as the ring plate 39 whereby a distinct wedging action on the porous body is obtained. In order to further inhibit the side wall migration of material, we provide the cone member 65 with a downwardly and outwardly extending lip 66, such lip extending substantially into engagement with the inner surface of the shell.

Various means may be provided for the purpose of effecting the vertical adjustment of the conical partition 65 and in this form of my invention I show the top of the cone as being provided with an angular ring 68 welded or otherwise secured thereto so as to present a flat top face 69. Extending downwardly through this ring and through openings 70 in the cone are a plurality of tension rods 71 having threaded upper ends 72 extending to a point just below the partition member 44. These rods are provided with angularly disposed cone supporting plates 72' and extend downwardly through sleeves 73. These sleeves have their upper ends mounted in the bottom or first partition member 36 as indicated at 74 and have their lower end portions extending through openings in the conical bottom 12 where they are sealed in any suitable manner such as by welding indicated at 75. The upper ends of the sleeves 73 may be provided with packing 76 to inhibit the entrance of the filter material into the sleeve and the bottoms of the sleeves are provided with stuffing boxes 77 which are effective to seal the tension rods 71 within the shell and to prevent leakage around these rods.

The lower ends of the rods 71 which extend downwardly below the stuffing boxes 77 are threaded as indicated at 78 and their threaded ends carry adjustment nuts 80, such nuts 80 being supported against axial movement by a cross member 81 and a collar member 82 which is keyed to the portion of the nut extending through the cross member 81. The cross member 81 may be rigidly supported in any suitable manner and in this form of my invention the same is shown as comprising a channel interposed between vertical channel legs 83 and 83' and supported against upward movement by braces 84 and 84'. In order to facilitate the adjustment of this member the nut assembly 80–82 may be associated with anti-friction bearings 85. In the event the shell is mounted close to the ground or the foundation 15, an oil filled well 86 may be provided to receive the lower threaded end of the rod as it is screwed down to compress the porous material.

In the fabrication of the shell 11, after the various rings have been assembled to a point where the second partition member 44 is to be installed, the chamber 43 is filled with the packing material which is securely packed therein during its installation. The movable partition 65 is then placed upon the packing material with the threaded ends of the rods 71 extending through their respective openings. The nuts 87 are then threaded onto these rods, the lower ends of the rods (which have been advanced to their uppermost position in the adjustment nuts 80) are held against rotation in any suitable manner and the movable partition is depressed by the nuts 87 to compress the body of porous material. If necessary the partition is then removed and additional material is added and compressed until the required amount of material has been packed within the chamber 43 at which time the conical partition is pressed into engagement with the supporting plates 72'. When this has been done, the fabrication of the shell is completed and any further adjustments to obtain the desired porosity in the body of scrubbing material are effected through the medium of the adjustment nuts 80, the interengagement between the plates 72' and bottom of the cone being effective to hold the rods against rotation.

As is best illustrated in Fig. 3, the partition member 44 carries what may be termed vertical chimneys 90 and 90' which are positioned over perforated regions 91 and 91' in this partition member. These chimney members are shown as being filled with porous packing material indicated at 92' and are provided with screens or other perforated cover plates 94 to hold the packing material in place. Inwardly extending flanges 95 are also provided in the chimney to prevent side wall migration of the fluid passing upwardly therethrough. Mounted over each of the chimneys is a hood member 96 which has outlet openings 97 near its lower edge and is provided with a gas vent pipe 98 in its top.

In certain types of operating conditions one of these rinsing chambers just described may suffice. In the form of apparatus shown herein I have illustrated the rinsing chamber as being divided by a partition 99 which forms a final rinsing chamber 99' thereabove. The partition 99 has perforated areas 99a and 99b, such areas being covered by chimney members 100 and 100' which may be filled with a packing material similar to the chimneys 90 and 90' or may be open, under which circumstances they merely act as liquid seals. These chimneys are provided with screen coverings 101 to catch any stray particles of the filtering material that may have been carried thereto and are also provided with hoods 102 having bottom openings 103. The hoods have bent pipes 104.

In operating this device it is customary as has been indicated above to fill the washing chamber 37 with a suitable washing liquid such as water or water containing a chemical such as soap adapted to disrupt the film of the particular emulsion being treated. The level of the washing liquid in the chamber 37 is maintained at any predetermined point above the lower edge of the ring baffle 52 and may extend up into the main scrubbing chamber above the bottom partition member 36. For the purpose of controlling the level L1 of the washing liquid in the shell, I provide the shell with a gauge glass 108.

It is also advisable in starting the operation of this device to place washing liquid, preferably water, in each of the rinsing chambers 47 and 99, the level of such liquid indicated at L2 and L3 in Fig. 3 being at a point below the upper edge of the chimneys 90 and 90' and 100 and 100' respectively, so that it is sealed in these respective chambers by the chimneys. The gauge glasses 109 and 110 are provided for the purpose of indicating and maintaining the proper levels of rinsing liquid in these chambers.

With the shell assembled and the chambers containing the desired amount of washing liquid as described above, the delivery valve is opened to deliver fluid mixture through the inlet pipe 16. In this connection it will be understood that the use of a heater is optional depending upon the character of the emulsion being treated and its reaction under temperature conditions. The liquid admitted into the washing chamber 37 through the pipe 16 will, as pointed out above, travel up and down through the system of baffle rings, being washed in the washing liquid as it travels, after which it will enter the annular distributing chamber 42 from which it is distributed throughout the mid-portion of the main body of filter material in the scrubbing chamber 43. The liquid then rises through the body of porous material and passes through perforations 111 near the periphery of the cone into the region below the partition member 44.

It will be understood that the washing liquid in the chamber 37 and the body of porous material in the scrubbing chamber 43 will be effective to free the liquid medium from solid materials and in the case of an emulsion will be effective to break down the emulsion, some of the free water coalescing into drops of sufficient size to gravitate into the bottom of the shell. When the liquid reaches the region in the scrubbing chamber above the cone therefore it will be comprised almost entirely of oil, the water therein being in suspension in minute drops. These drops will continue to coalesce to a certain extent and will gravitate in the cone which is provided with a small drain opening 113 to permit the drainage of water released at this point.

The oil then, with its suspended water, passes up through the perforations 91 and 91' into the chimneys where it is given a final or semi-final scrubbing action by the porous material therein after which it flows downwardly through the hood and passes out in small streams through the perforations 97 into the body of water in the chamber 47 where, under this condition of wide distribution, the minute particles of water in the oil are coalesced by the body of water through which it passes to effect a rinsing action and finally remove suspended drops of water from the oil. The rinsing chamber 99 acts the same as the rinsing chamber 47 and merely assures a complete separation of the oil and water. The valves on the drainage pipes 28, 28a and 28b may either be adjusted or intermittently opened to take care of the accumulation of water in the washing and rinsing chambers so that the level is maintained at the proper point.

After the process has been set in operation and operating conditions have been substantially established, the operator may adjust the adjusting nuts 80 to vary the compression on the body of packing material for obtaining the desired porosity to give the proper quality in the product under the most efficient flow conditions. In other words, it is preferable to adjust the compression on the porous body so as to maintain the maximum rate of flow which will at the same time effect the required separation.

Pressure gauges A, B and C are shown as being provided on the shell (see Fig. 3) in the washing chamber and near the top and bottom portions of the scrubbing chamber. By observing the drop in pressure between these successive gauges, the operator can observe when and where the porous body has become clogged with solids or tarry material to the point at which flow therethrough is substantially restricted. When this condition has been reached the manhole covers over the openings 31 adjacent the clogged region are removed and such regions may be repacked. If desired, however, the filter body may, under some circumstances, be cleaned by passing a suitable solvent liquid through the shell. It will be observed from Fig. 4 that the inner ring 41 of the annular distributing chamber 42 is provided with manhole openings 31b positioned opposite the manhole openings 31a so that the material in the main body within the scrubbing chamber can also be inspected from the openings 31a.

Although my invention is illustrated herein in connection with a gravity feed, it is to be understood that the system may be operated under pressure, either by employing a pump feed, or by connecting the pipe 20 directly to the flow system of a well.

When the system is being operated under substantial pressure, the provision of the safety valve 21a becomes important, and also under pressure operating conditions there is a tendency for the liquid to be forced into the top of the tank or shell through the gas vent pipe 21 and, as has been previously pointed out the float valve 21' is provided to prevent this occurring.

Various types of construction may be employed in the float valve 21' and in the form shown, this construction is illustrated as comprising a housing 121 having inlet and outlet connections 122 and 123. The outlet connection 123 has a valve seat 124 adapted to be engaged by a valve 125 mounted on the top of a float member 126. The float member 126 is provided with radially extending guide flanges or webs 127 which project downwardly below the bottom of the float to form supporting legs.

As long as the liquid level in the pipe 21 is below the float valve housing 121 the valve 125 is open and gas only escapes through the outlet connection 123 into the top of the shell. In the event a surge of pressure carries the liquid level in pipe 21 up into the housing 124 the float is elevated to close the valve 125 thereby forcing the liquid to enter the shell through the main inlet connection 16 at all times.

It is to be understood that while I have herein described in detail one preferred procedure followed in the practice of the process contemplated by this invention and have described and illustrated one preferred form of apparatus for use in conjunction therewith, that the invention is not limited to the precise process operations or the specific details in the apparatus but includes within its scope whatever changes fairly come within the spirit of the appended claims.

I claim as my invention:

1. In a device for cleaning and separating a contaminated fluid mixture the combination of: a vertical shell having a fluid inlet near its bottom; a partition member in said shell above said inlet forming a washing chamber therebelow; a second perforated partition in the upper portion of said shell forming a main scrubbing chamber between said first and second partitions; a porous body between said partitions; fluid outlet means above said second partition, said first partition having perforations therein; and baffle means mounted on the bottom of said first mentioned partition between said fluid inlet and the perforations in said first partition, said baffle means comprising radially spaced inner and outer baffle rings mounted on the bottom of said first partition and having perforations near their lower edges, and an intermediate baffle ring suspended between said inner and outer rings with its upper edge located in a plane below the bottom of said first partition and above the lower edges of the inner and outer baffle rings.

2. In a device for cleaning and segregating a contaminated fluid mixture, the combination of: a vertical shell having a fluid inlet near its bottom; a first partition member in said shell above said inlet forming a washing chamber therebelow, said first partition member having perforations near the wall of said shell; a second perforated partition member near the top of said shell forming a scrubbing chamber between said first and second partitions; auxiliary partition means mounted above said first partition forming an annular chamber above the perforated region of said first partition, said auxiliary partition means having perforations providing communication between said annular chamber and said scrubbing chamber; a packing of porous material in said scrubbing chamber; and fluid outlet means in said shell above said second partition.

3. In a device for cleaning and segregating a contaminated fluid mixture, the combination of: a vertical shell having a fluid inlet near its bottom; a pair of vertically spaced horizontal fixed partitions in said shell forming a bottom washing chamber, an intermediate scrubbing chamber and a top rinsing chamber; a packing of compressible porous material in said intermediate chamber; a movable partition in said intermediate chamber above said packing; means for imparting vertical adjustment to said movable partition to vary the compression and porosity in said packing material; and fluid outlet means in the top portion of said chamber, said fixed partitions and said movable partition being provided with fluid passages, and said movable partition and its associated adjustment means comprising a cone positioned in said shell with its apex extending downwardly into said packing material, an annular lip on the periphery of said cone extending downwardly and outwardly into engagement with the wall of said shell, a plurality of screw rods secured to said cone and extending vertically through a wall of said shell, sealing means interposed between said screw rods and said shell, adjustment nuts on the extending ends of said screw rods, and means supporting said adjustment nuts against axial movement.

4. In a device for cleaning and segregating a contaminated fluid mixture, the combination of: a vertical shell having a fluid inlet near its bottom; a partition mounted in said shell above said fluid inlet forming a washing chamber therebelow and a scrubbing chamber thereabove, said partition having a plurality of angularly spaced sets of perforations therein; an angular partition member mounted on top of said first mentioned partition above the perforated region thereof and cooperating with the wall of said shell to form an auxiliary chamber in said scrubbing chamber, said angular partition member having sets of perforations in that portion forming the inner wall of said auxiliary chamber arranged in staggered relation with the sets of perforations in said first mentioned partition; a porous packing in said scrubbing chamber; and outlet means in the upper end of said shell.

LAWRENCE A. HOLMES.